United States Patent
Asiri et al.

(10) Patent No.: US 9,631,989 B1
(45) Date of Patent: Apr. 25, 2017

(54) METHOD OF MAKING FLEXIBLE ELASTIC CONDUCTIVE MATERIAL AND USE OF THE SAME

(71) Applicant: KING ABDULAZIZ UNIVERSITY, Jeddah (SA)

(72) Inventors: Abdullah Mohamed Asiri, Jeddah (SA); Sher Bahadar Khan, Jeddah (SA); Khasan S Karimov, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 15/044,046

(22) Filed: Feb. 15, 2016

(51) Int. Cl.
| | | |
|---|---|---|
| *H01B 5/14* | (2006.01) | |
| *G01L 1/22* | (2006.01) | |
| *H01C 10/10* | (2006.01) | |
| *H01C 17/00* | (2006.01) | |

(52) U.S. Cl.
CPC .......... *G01L 1/2287* (2013.01); *H01C 10/106* (2013.01); *H01C 17/00* (2013.01)

(58) Field of Classification Search
CPC . H01B 5/14; C25D 7/00; C23C 14/34; D06M 11/83; D06B 1/00; G08B 21/0461
See application file for complete search history.

(56) References Cited

U.S. PATENT DOCUMENTS

| | | | | |
|---|---|---|---|---|
| 8,746,075 B2* | 6/2014 | Eichhorn | .............. | G01L 9/0035 73/777 |
| 2011/0278040 A1* | 11/2011 | Zhang | .................. | B29C 70/086 174/69 |
| 2013/0079693 A1* | 3/2013 | Ranky | .................. | H01L 41/314 602/28 |
| 2013/0214214 A1* | 8/2013 | Carnahan | ................. | H01B 1/24 252/511 |
| 2013/0218050 A1* | 8/2013 | Eichhorn | ............... | B82Y 15/00 600/587 |

FOREIGN PATENT DOCUMENTS

JP KR20130142188 * 12/2013

* cited by examiner

*Primary Examiner* — Minh Trinh
(74) *Attorney, Agent, or Firm* — Geeta Kadambi; Riddhi IP LLC (57) ABSTRACT

The method of making a flexible elastic conductive material for strain sensor and resistance applications using rubbing-in technology is shown. The thin rubber or any conductive material (substrates) is fixed at strained condition on the solid plate, by rubbing-in technology. Nanopowder of nanomaterials (organic semiconductors, carbon nanotubes, copper doped tin oxide, manganese doped tin oxide) at room temperature are embedded into the rubber conductive material to make built-in structure of conductive flexible elastic substrates that can be used for strain sensors, gages and resistance applications. The resultant product showed good sensitivity, stability and reliability during and after the rubbing-in operation.

6 Claims, 6 Drawing Sheets

METHOD OF MAKING FLEXIBLE ELASTIC CONDUCTIVE MATERIAL AND USE OF THE SAME

FIELD OF TECHNOLOGY

This disclosure generally relates to method of making flexible conductive material using a rubbing-in process. More specifically making a conductive and semi-conductive flexible and elastic conductive material for strain sensors and resistance application using a rubbing-in process.

BACKGROUND

In the industry flexible conductive adhesive having a low modulus of elasticity is applied as conductive bumps on the contact pads of the substrate or on the contact pads of the semiconductor chips. Many types of adhesives, fillers, resins and conductive particles are used for making the substrate for a flexible adhesive membrane to be used in semiconductor chips, resistors, capacitors etc. and the process of making these layers take an enormous amount of time, money and steps. The adhesive joints are local and do not span the entire length and breadth of the material they are used on.

An electronic device includes electronic components, such as "flip chip" semiconductor devices, chip resistors, capacitors and other electronic components, mounted and interconnected to a substrate by a flexible adhesive membrane having contact pads that have substantially the same pattern as those of the corresponding electronic components [3]. The flexible adhesive membrane includes an insulating matrix and conductive pads therein that employ thermoplastic and thermosetting adhesives, and combinations thereof, each having a low modulus of elasticity. A low stress conductive material or paste adhesive that comprises a) one or more functional acrylic copolymers or terpolymers; b) epoxy; and c) conductive filler was described [4]. A sealed-by-resin type semiconductor device includes a substrate, a lead provided on the substrate, and a semiconductor element provided on the lead by flip chip bonding was described [5]. Several different types of electrically conductive elastomers are disclosed along with the methods for their fabrication: in one particular embodiment, a layered composition is disclosed which comprises a substrate, a first layer, and a second layer, the substrate is formed of a non-conductive elastic material and it has an outer surface [6]. A quantity of rounded or jagged conductive particles may be imbedded in an outer surface of the second layer.

An electronic device includes electronic components, such as "flip chip" semiconductor devices, chip resistors, capacitors and other electronic components, mounted to and interconnected to a substrate by a flexible adhesive membrane having contact pads that have substantially the same pattern as those of the corresponding electronic components [7]. Thermal transfer between a semiconductor wafer and a platen during vacuum processing is provided through a soft, thermally-conductive polymer layer having a thin, hard surface conductive material [8]. The soft polymer layer, which is preferably silicon rubber containing thermally-conductive particles, conforms to surface irregularities on the wafer and has low thermal resistance.

The flexible elastic conductive materials can be used for strain sensor applications [9,10]. A strain sensor is a device that converts the changes in the length ($\Delta l$) of the sensor or object into change in the resistance ($\Delta R$) in the sensor. Strain (S) is ratio of $\Delta l$ to length (l) [9,10]:

$$S = \Delta l / l \quad [1]$$

Sensitivity of sensor or gauge factor (G) is:

$$G = \Delta R / RS \quad [2]$$

The strain sensitivities of some sensors that are used in practice, for example, for constantan and silicon are equal to 2.1 and 120, respectively [9,10]. The materials and strain sensors sensitivities are presented in order to bring some examples of the materials and devices which are used at present in practice. There is a need for a better fabrication method of the conductive material that is cheap and easy to fabricate.

SUMMARY

The invention discloses the method of making a flexible elastic conductive material by rubbing-in a nanoparticle of a nanomaterial at room temperature on to a flexible elastic conductive material. In one embodiment, a flexible elastic conductive material is strained to incorporate nanoparticles. In another embodiment, an optimal tension is used to strain the flexible elastic conductive material that may be used as a conductive material during the rubbing-in process. The flexible elastic conductive material may be made up of a conductive material.

In one embodiment, a nanoparticle of a nanomaterial (hence forth mentioned as nanoparticle) of choice is applied on the strained flexible elastic conductive material surface and physically rubbed into the stretched flexible elastic conductive material. In another embodiment, fabrication of a conductive material by rubbing-in technology of nanoparticles into the flexible elastic conductive material such as a rubber material at room temperature is conducted. In another embodiment, wherein the nanoparticle is at least one of carbon nano tubes (CNT) 5 wt. %, copper phthalocyanine (CuPc) 5 wt. %, nanoparticle carbon nano tubes (CNT) 3 wt. %, nickel phthalocyanine (NiPc) 7 wt. %, nanoparticles carbon nano tubes (CNT) 3 wt. % and copper oxide codoped tin oxide 7 wt. %.

In one embodiment the rubbing-in technology method may be performed in room temperature. In another embodiment, the strain sensors and resistances can be used in equipment's and the resistors must withstand the process initiated shaking and be structurally sound.

In one embodiment, changing of the ratio of components (ingredients) or composition of the composites allows to change impedance, resistance, conductivity, ratio $Z/Z_o$ and ratio $R/R_o$.

The novel method of making and method of using the novel conductive surface using rubbing-in, disclosed herein, may be implemented in any means for achieving various aspects. Other features will be apparent from the accompanying figures and from the detailed description that follows.

BRIEF DESCRIPTION OF THE DRAWINGS

Example embodiments are illustrated by way of example and no limitation in the tables and in the accompanying figures, like references indicate similar elements and in which.

Other features of the present embodiments will be apparent from the accompanying figures and the detailed description that follows.

DETAILED DESCRIPTION

Several embodiments for a method of making (fabricating) flexible elastic conductive material by rubbing-in technology, having a specific composition, to be used in semiconductor, resistors etc., are disclosed. Although the present embodiments have been described with reference to specific example embodiments, it will be evident that various modifications and changes may be made to these embodiments without departing from the broader spirit and scope of the various embodiments.

A novel rubbing-in technology and method are described to incorporate nanoparticles into flexible elastic conductive materials in a economical and easy way. Some examples of flexible conductive materials that can be used are, for example rubber, porous ceramic, glass, polymers, elastic polyurethane foam etc.

Many types of adhesives, films, fillers, resins and conductive particles are used for making the substrate for a flexible adhesive membrane to be used in semiconductor chips, resistors, and capacitors. The instant technique allows the user to elect a specific region on the chip, resistor or capacitor to be filled with a specific nanomaterial and/or a combination of nanomaterial for a specific use.

Different nanomaterial and different combination of nanomaterial, different ratios are presented. The effectiveness of the rubbing-in process, the weight used for the rubbing-in process, the method of conducting the rubbing-in process, nanomaterial type, size, combination, ratio were tested and the impedance, resistance and conductivity was measured for all.

The commercially available (Sun Nanotech Co Ltd., China) multiwall CNTs powder with diameter varied between 10-30 nm, and the composites of organic semiconductors copper phthalocyanine (CuPc), nickel phthalocyanine (NiPc), copper oxide codoped tin oxide, manganese oxide codoped tin oxide were used in the experiments. Copper oxide codoped tin oxide and manganese oxide codoped tin oxide were synthesized by simple hydrothermal method.

Carbon nano-tubes (CNTs) powder and its blends with CuPc, NiPc, copper oxide codoped tin oxide, manganese oxide codoped tin oxide were used for the fabrication of nanocomposites. As substrates the dense rubber having a thickness of 80 μm that are medical grade were procured.

A method of rubbing-technology was performed in four steps: Step 1: Flexible conductive elastic conductive material such as Rubber substrate is first fixed on the polished solid plate at strained conditions (strain S=1.4-1.6). Step 2: Nanomaterial is dispersed on the flexible conductive elastic conductive material (in this case made of rubber). Step 3: The dispersed nanomaterial were incorporated in to the flexible conductive elastic conductive material by rubbing-in with polished metallic load and providing pressure in several directions. Step 4: The prepared flexible conductive elastic conductive material is released from the polished solid plate. Besides being cheap and easy, this process is superior to already existing technology because nanomaterial is incorporated in the strained flexible conductive elastic conductive material such as a rubber substrate quickly. Due to strained condition of the substrate the pore size on the substrate is increased and allows the nanomaterials to get into those pores. Once the strain is removed from the substrate the nanomaterial is squeezed in substrate" body. Therefore the fabricated devices show stable properties.

Figure 1A:
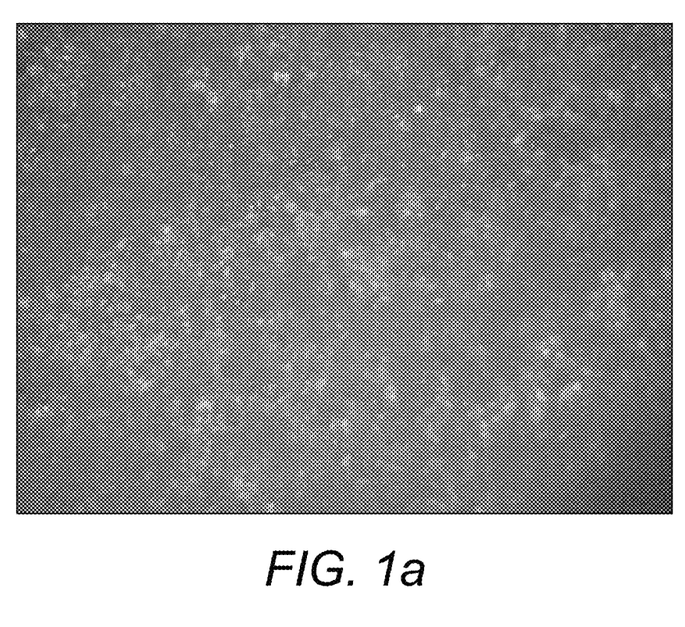
FIGS. 1a and 1b shows Optical microscope images of the rubber conductive materials at strained conditions at magnification of 100 times (1a) and 400 times (1b).
Figure 1B:
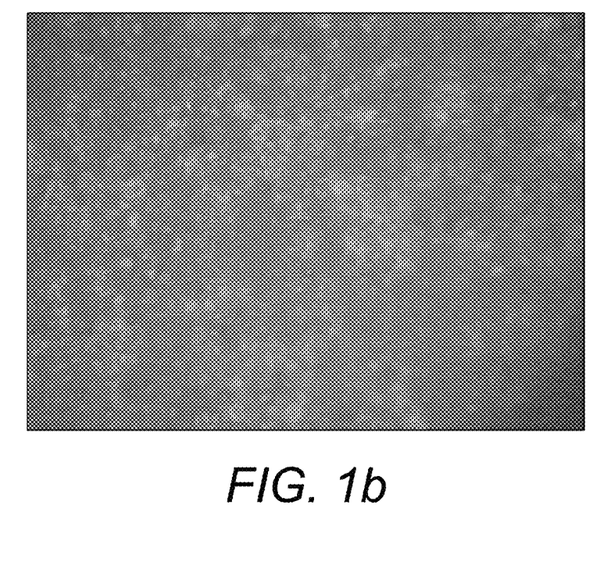
Figure 2:
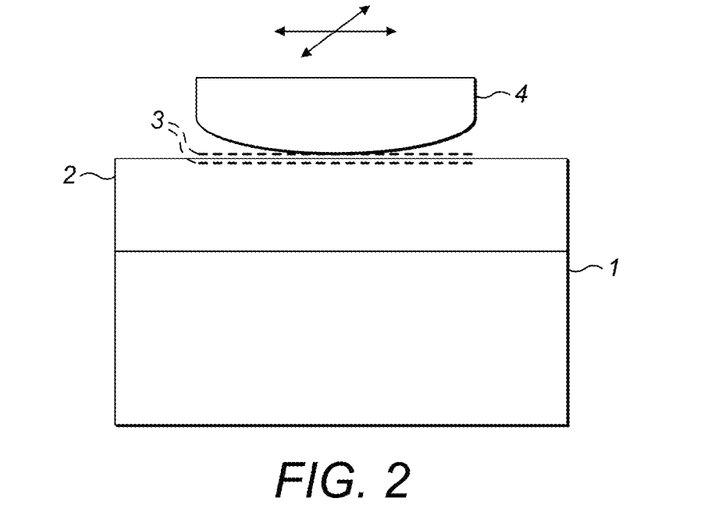
FIG. 2 shows Fabrication by rubbing in technology of flexible elastic conductive materials for strain sensor and resistance applications.

FIG. 1(a) and FIG. 1(b) show optical microscope images of the rubber substrates at strained conditions. The samples were fabricated by the following way. FIG. 2 shows procedure for fabrication by rubbing in technology of flexible elastic conductive materials for strain sensor and resistance applications. The numbers represent: plate (1), rubber substrate (2), nanoparticles (3), and load (4). Rubber substrates were fixed on the polished solid plate at strained conditions (strain S=1.4-1.6). The polished metallic load was used for rubbing in the nanomaterial into the substrate. Special mechanism is used to move the load in horizontal plane and into two perpendicular directions as shown in the FIG. 2. Rubbing-in procedure takes 2-3 min. The pressure of the load to the surface of the sample were in the range of (8-10) g/cm$^2$. The resultant product shows that the nanomaterial was well dispersed in the samples with active sizes of 10 mm:10 mm:80 μm. It is considered that at strained condition of the rubber substrate the porous sizes in the conductive material increased that make easier to realize by rubbing-in technology to embed nanomaterials into organic semiconductors, carbon nanotubes, copper oxide codoped tin oxide, manganese oxide codoped tin oxide at room temperature. The rubber substrate to make built-in structure of conductive flexible elastic conductive materials that can be used for strain sensors and resistances applications. After of fabrication of the conductive rubber conductive materials, the samples are at normal condition (without of strain) the porous sizes decrease, the nanoparticles will be squeezed into those retracted pores and as a result the conductive materials show stable electrical properties.

Figure 3:
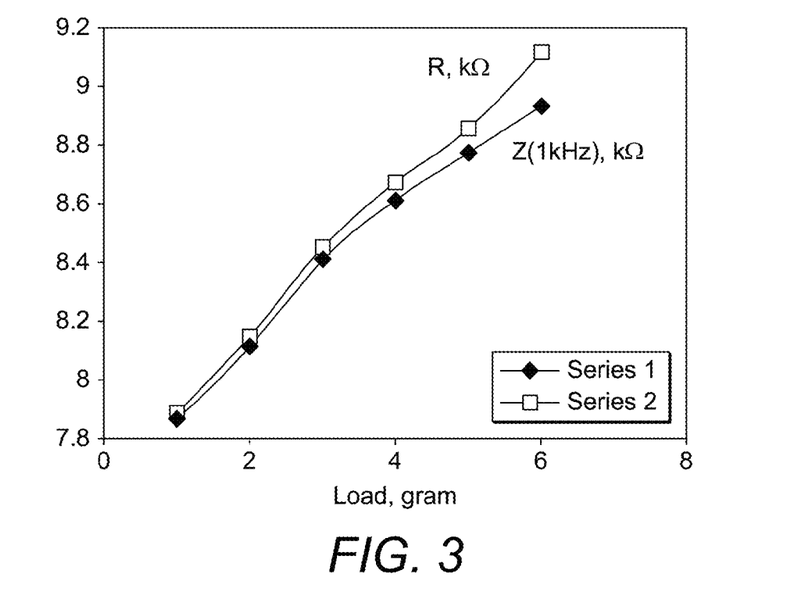
FIG. 3 shows impedance/resistance-load relationships for CNT-Rubber sample.

FIG. 3 shows impedance/resistance-load relationships for CNT-Rubber sample. It is seen that under load in the range of (1-6) gram the resistance and impedance of the sample in average increase from 7.85 kΩ to 9 kΩ. It means under load, i.e. stress, the strain take place and the resistance of sample increases on 14%. It can be used in practice for fabrication of strain gages.

Figure 4:
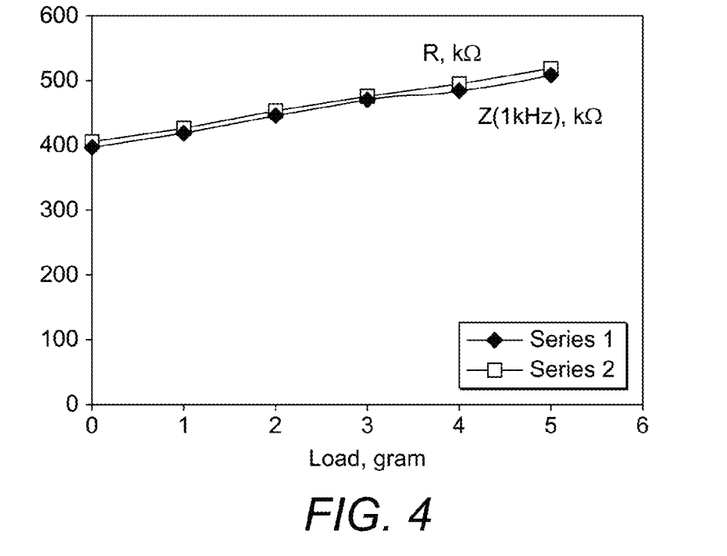
FIG. 4 shows impedance/resistance-load relationships for (CNT-CuPc)-Rubber sample.

FIG. 4 shows impedance/resistance-load relationships for (CNT-CuPc)-Rubber sample. It is seen that under load in the range of (1-5) gram the resistance and impedance of the sample in average increase from 400 kΩ to 520 kΩ. It means under load, i.e. stress, the strain take place and the resistance of sample increases on 28.5%. It can be used in practice for fabrication of strain gages.

Figure 5:
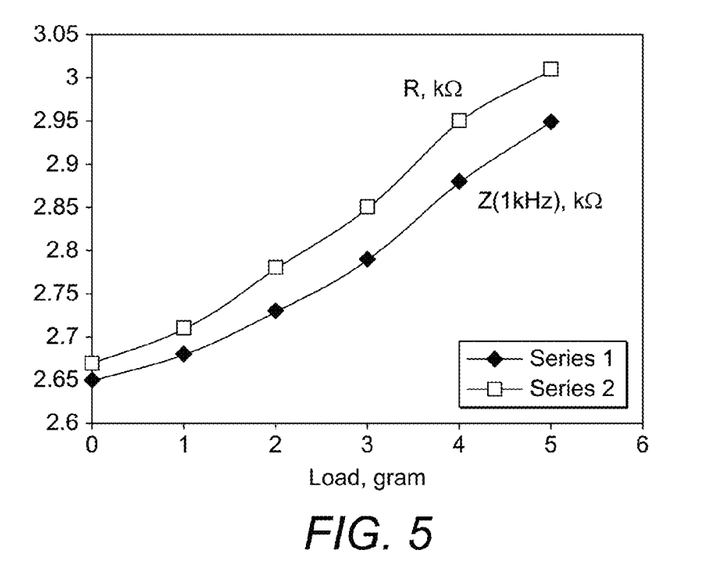
FIG. 5 shows impedance/resistance-load relationships for (CNT-NiPc)-Rubber sample.

FIG. 5 shows impedance/resistance-load relationships for (CNT-NiPc)-Rubber sample. It is seen that under load in the range of (1-5) gram the resistance and impedance of the sample in average increase from 2.66 kΩ to 2.98 kΩ. It means under load, i.e. stress, the strain take place and the resistance of sample increases on 12%. It can be used in practice for fabrication of strain gages.

Figure 6:
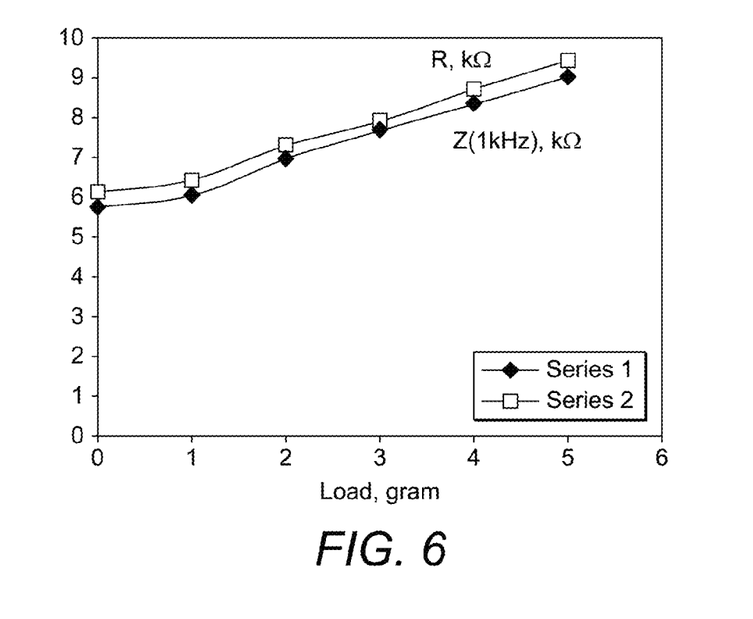
FIG. 6 shows impedance/resistance-load relationships for (CNT-copper doped tin oxide)-Rubber sample.

FIG. 6 shows impedance/resistance-load relationships for CNT-copper oxide codoped tin oxide)-Rubber sample. It is seen that under load in the range of (1-5) gram the resistance and impedance of the sample increase from 6 kΩ to 9.3 kΩ. It means under load, i.e. stress, the strain take place and the resistance of sample in average increases 55%. It can be used for fabrication of strain gages.

Figure 7:
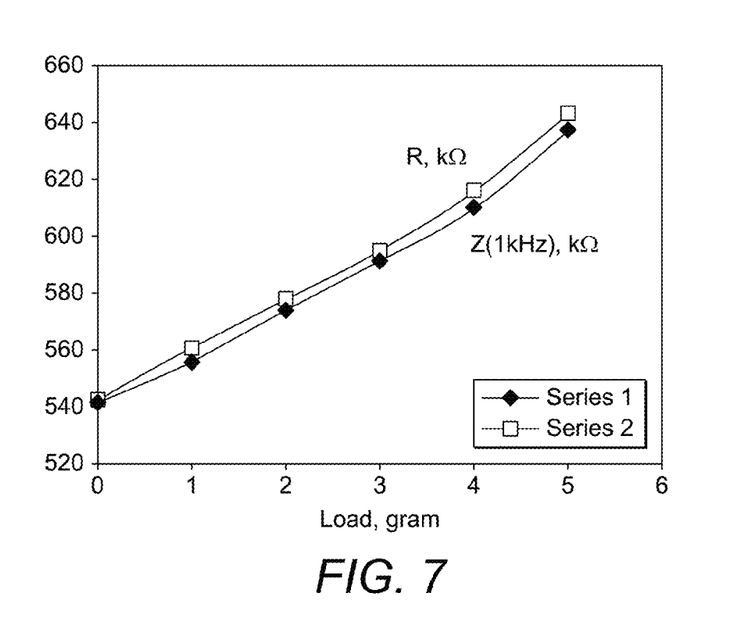
FIG. 7 shows impedance/resistance-load relationships for CNT-manganese doped tin oxide)-Rubber sample.
Figure 8:
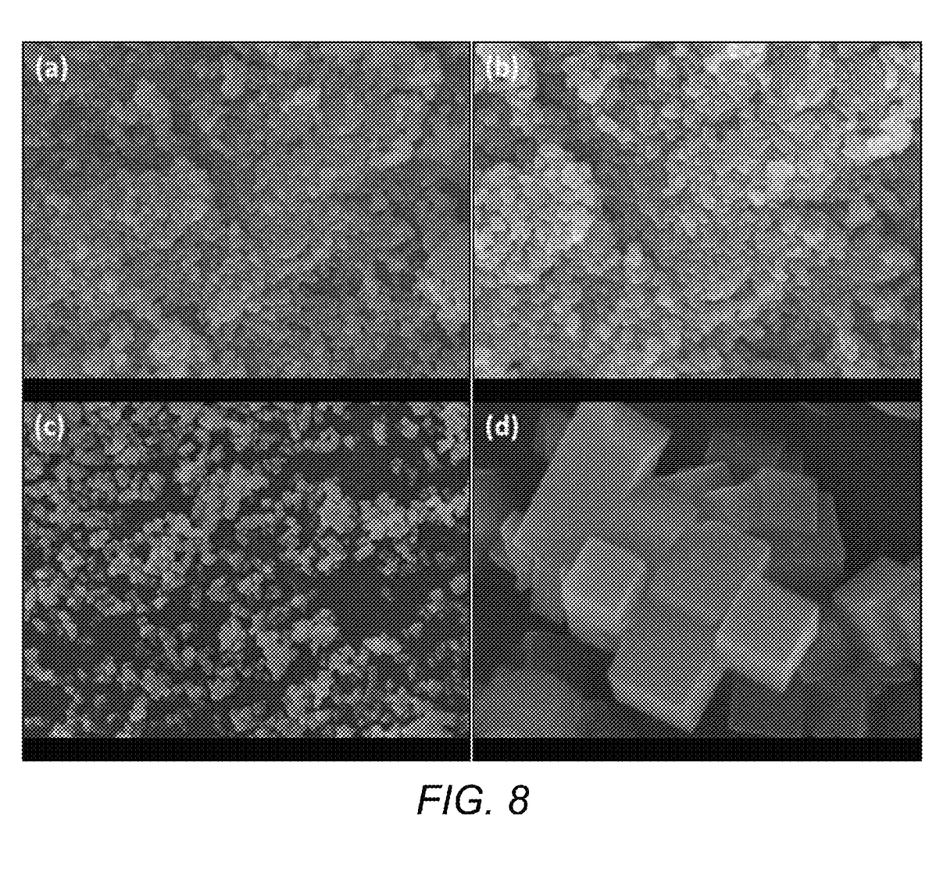
FIG. 8 shows FESEM images of copper doped tin oxide (a,b) and manganese doped tin oxide (c,d).
Figure 9:
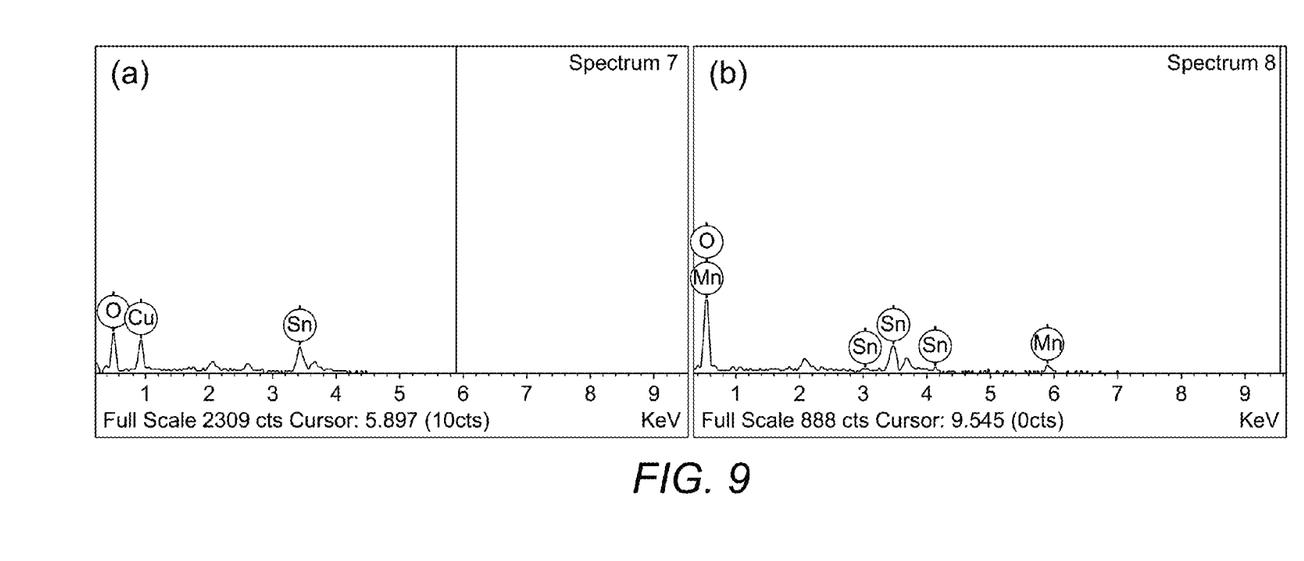
FIG. 9 shows EDS spectrum of copper doped tin oxide (a) and manganese doped tin oxide (b).

FIG. 7 shows impedance/resistance-load relationships for CNT-manganese oxide codoped tin oxide)-Rubber sample. It is seen that under load in the range of (1-5) gram the resistance and impedance of the sample increase from 540 kΩ to 640 kΩ. It means under load, i.e. stress, the strain take place and the resistance of sample increases 14%. It can be used in practice for fabrication of strain gages. Comparison of the results presented in FIG. 3-FIG. 7 shows that highest effect of the load to the resistance and impedance took place for the sample shown in FIG. 6, and lowest effect is shown in FIG. 3 and FIG. 7. FIG. 8 shows FESEM images of copper doped tin oxide (a,b) and manganese doped tin oxide (c,d) which shows that copper doped tin oxide and manganese doped tin oxide are grown in spherical and cubic shape respectively. FIG. 9 shows EDS spectrum of copper doped tin oxide (a) and manganese doped tin oxide (b) confirming the presence of Cu, Sn and O in copper doped tin oxide and Mn, Sn and O in manganese doped tin oxide. Maximum stress at maximum load (5 gram) was equal to $6.1 \cdot 10^4$ N/m$^2$. Table 1 shows composition, initial impedance, resistance, conductivity, values of the samples and changing of impedance ($Z/Z_o$) and resistance ($R/R_o$) under load.

rubbing in technology easier to realize the embedding of nanopowder of nanomaterials (at room temperature) to the rubber substrate to make built-in structure of conductive flexible elastic substrates that can be used for strain sensors and resistances applications. This technology is simple, easy to realize at room temperature and allows fabricating stable samples.

INDUSTRIAL APPLICABILITY

The sensors fabrication is very simple and they show good sensitivity and reliability in operation. Fabrication technology of the samples rubbing in is realized at room temperature condition therefore the method has been proved to be simple and economical. The samples show stabile of properties and reliability as the substrates are dense rubber. As only pristine nanomaterials and dense rubber have been used, so the fabricated samples are inexpensive from the point of cost of materials. Easy to repair of the samples by repeating of the rubbing in process on strained rubber substrate. Easy recycling and disposal of the samples materials. The strain sensors and resistances can be used in instrumentation and electronic circuits. The rubbing in technology rubbing in can be used also for fast selection of different materials for use in the strain sensors and resistances as only pristine materials in the form of nanopowder can be used. Changing of the ratio of components (ingredients) or composition of the composites allows to change the impedance, resistance, conductivity, ratio $Z/Z_o$ and ratio $R/R_o$. Flexible and elastic strain sensors and resistances can be used in shake proof equipment.

TABLE 1

| No. | Composition | Impedance | Resistance | Conductivity | Ratio $Z/Z_o$ | Ratio $R/R_o$ |
|---|---|---|---|---|---|---|
| 1. | CNT(10 wt. %)-Rubber | 7.87 kΩ | 7.89 kΩ | $1.58 \cdot 10^{-2}$ Ω$^{-1}$cm$^{-1}$ | 1.13 | 1.15 |
| 2. | CNT(5 wt. %)-CuPc(5 wt. %)}-Rubber | 396 kΩ | 405 kΩ | $3.09 \cdot 10^{-4}$ Ω$^{-1}$cm$^{-1}$ | 1.28 | 1.29 |
| 3. | CNT(3 wt. %)-NiPc(7 wt. %)}-Rubber | 2.65 MΩ | 2.67 MΩ | $4.68 \cdot 10^{-5}$ Ω$^{-1}$cm$^{-1}$ | 1.11 | 1.13 |
| 4. | CNT(3 wt. %)-copper oxide codoped tin oxide (7 wt. %)}-Rubber | 5.75 MΩ | 6.11 MΩ | $2.05 \cdot 10^{-5}$ Ω$^{-1}$cm$^{-1}$ | 1.54 | 1.56 |
| 5. | CNT(5 wt. %)-manganese oxide codoped tin oxide (5 wt. %)}-Rubber | 542 kΩ | 543 kΩ | $2.3 \cdot 10^{-4}$ Ω$^{-1}$cm$^{-1}$ | 1.17 | 1.1 |

$Z_o$ and $R_o$ are initial values of impedance and resistance at load equal to zero.

The content of the conductive material (CNT,CuPc, NiPc, ES7 and ES15) in the samples is shown in wt. % with respect of rubber substrate. The dependence of the resistance and strain on stress was investigated by using laboratory equipment fabricated for this purpose. For the measurement of resistance and impedance (at 1 kHz) the LCR meter MT 4090 was used.

It was found that rubbing-in technology allows to fabricate stable composite flexible elastic rubber samples of conductive (CNT), organic semiconductors (CuPc,NiPc) and nanomaterials (copper oxide codoped tin oxide and manganese oxide codoped tin oxide) if the rubber substrates were in strained condition. Obviously at strained condition the porous of rubber substrate increases that allows by

What is claimed is:

1. A method of making a conductive elastic material by a rubbing-in technology for an electrical components or an electrical device, said method comprising sequential order of:
   providing an elastic material to be fixed on a polished metal plate;
   stretching the elastic material fixed on the polished metal plate from a non-stretched position by applying a pressure evenly on each ends of the elastic material to a stretched position to open up a number of pores in a stretched elastic material;
   dispersing a nanoparticle on a center surface of the stretched elastic material;

applying a pressure by a specific weight on the center surface of the stretched elastic material containing the dispersed nanomaterial;

changing a direction of the specific weight for applying the pressure by the rubbing-in technology; and removing the pressure on the ends of the stretched elastic material containing the nanoparticle to regain the non-stretched position from the stretched position so that the open pores become a closed pores on the elastic material and trap the nanoparticle in the closed pore of the elastic material to form the conductive elastic material.

2. The method of claim 1, wherein the nanoparticle makes 10 wt. % carbon nano tubes (CNT).

3. The method of claim 1, wherein the nanoparticle makes 5 wt. % carbon nano tubes (CNT) and 5 wt. % copper phthalocyanine (CuPc).

4. The method of claim 1, wherein the nanoparticle makes 3 wt. % carbon nano tubes (CNT) and 7 wt. % nickel phthalocyanine (NiPc).

5. The method of claim 1, wherein the nanoparticle makes 3 wt. % carbon nano tubes (CNT) and 7 wt. % copper doped tin oxide.

6. The method of claim 1, wherein the nanoparticle makes 5 wt. % carbon nano tubes (CNT) and 5 wt. % manganese doped tin oxide.

* * * * *